United States Patent
Kaganovich et al.

(10) Patent No.: US 9,370,085 B2
(45) Date of Patent: Jun. 14, 2016

(54) COMPACT, ALL-OPTICAL GENERATION OF COHERENT X-RAYS

(71) Applicants: Dmitri Kaganovich, Potomac, MD (US); Antonio C. Ting, Silver Spring, MD (US); Michael H. Helle, Arlington, VA (US); Daniel F. Gordon, Alexandria, VA (US); Bahman Hafizi, Bethesda, MD (US); John Palastro, College Park, MD (US)

(72) Inventors: Dmitri Kaganovich, Potomac, MD (US); Antonio C. Ting, Silver Spring, MD (US); Michael H. Helle, Arlington, VA (US); Daniel F. Gordon, Alexandria, VA (US); Bahman Hafizi, Bethesda, MD (US); John Palastro, College Park, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/798,599

(22) Filed: Jul. 14, 2015

(65) Prior Publication Data

US 2016/0014874 A1  Jan. 14, 2016

Related U.S. Application Data

(60) Provisional application No. 62/023,983, filed on Jul. 14, 2014.

(51) Int. Cl.
*H05G 2/00* (2006.01)
*H01S 4/00* (2006.01)

(52) U.S. Cl.
CPC ........ *H05G 2/008* (2013.01); *H01S 4/00* (2013.01); *H05G 2/003* (2013.01)

(58) Field of Classification Search
CPC ......... H05G 2/00; H05G 2/001; H05G 2/003; H05G 2/008
See application file for complete search history.

(56) References Cited

U.S. PATENT DOCUMENTS

2015/0146748 A1   5/2015   Kaganovich et al.

FOREIGN PATENT DOCUMENTS

WO    WO 2013153156 A1 * 10/2013 ............... H05G 2/00

OTHER PUBLICATIONS

P. Sprangle, A. Ting, E. Esarey, and A. Fisher, "Tunable, short pulse hard xrays from a compact laser synchrotron source," J. Appl. Phys. 72, 5032 (1992).

A. Ting, R. Fischer, A. Fisher, K. Evans, R. Burris, J. Kral!, E. Esarey, and P. Sprangle, "Observation of 20 eV xray generation in a proof of principle laser synchrotron source experiment," J. Appl. Phys. 78, 575 (1995).

P. Sprangle, E. Esarey, A. Ting and G. Joyce, "Laser Wake Field Acceleration and Relativistic Optical Guiding," Appl. Phys. Lett. 53, 2146 (1988).

(Continued)

*Primary Examiner* — Glen Kao
(74) *Attorney, Agent, or Firm* — US Naval Research Laboratory; Joslyn Barritt

(57) ABSTRACT

A method for generating coherent, polarized, and tunable X-rays using a single laser pulse is provided. An ultrashort laser pulse is fired into a plasma. As the laser beam travels through the plasma, some of its photons are backscattered, e.g., through Raman backscattering, to generate a counter-propagating photon beam that is co-linear with the original laser beam. When the backscattered photons interact with high-energy accelerated periodic electron bunches, coherent X-rays are generated through Compton backscattering of the photons off of the electrons. The energy of the backscattered X-rays can be tuned by tuning one or more characteristics of the laser pulse and/or the plasma.

17 Claims, 2 Drawing Sheets

(56) References Cited

OTHER PUBLICATIONS

D. Kaganovich, P. Sasorov, C. Cohen, and A. Zigler, "Investigations of double capillary discharge scheme for production of wave guide in plasma," Appl. Phys. Lett. 71, 2925 (1997).

C.G. Durfee III and H.M. Milchberg, "Light pipe for high intensity laser pulses," Phys. Rev. Lett. 71, 2409 (1993).

N.E. Andreev, "Excitation of Langmuir Oscillations in a Plasma by the Field of a Transverse Wave," Soviet Physics JETP, vol. 32, No. 6 (1971).

C.G.R. Geddes, K. Nakamura, G.R. Plateau, C. Toth, E. Cormier-Michel, E. Esarey, C.B. Schroeder, J.R. Cary, and W. P. Leemans, "Plasma-Density-Gradient Injection of Low Absolute-Momentum-Spread Electron Bunches," Phys. Rev. Lett. 100, 215004 (2008).

D. Kaganovich, D.F. Gordon, M.H. Helle, and A. Ting, "Shaping gas jet plasma density profile by laser generated shock waves," Journal of Applied Physics 116, 013304 (2014).

\* cited by examiner

COMPACT, ALL-OPTICAL GENERATION OF COHERENT X-RAYS

CROSS-REFERENCE

This application is a Nonprovisional of, and claims the benefit of priority under 35 U.S.C. §119 based on, U.S. Provisional Patent Application No. 61/023,983 filed on Jul. 14, 2014, the entirety of which is hereby incorporated by reference into the present application.

TECHNICAL FIELD

The present invention relates to generation of X-rays, in particular to the generation of X-rays by a compact, monochromatic source of X-rays that utilizes a single laser pulse for its operation.

BACKGROUND

High-quality X-rays can be used for applications ranging from analyzing the structure of matter to advanced medical imaging. State-of-the-art X-ray sources can now produce coherent high-brightness X-rays of greater than kiloelectron-volt energy and promise a new revolution in imaging complex systems on nanometer and femtosecond scales.

X-rays are generated by means of Compton scattering through the collision of photons with energetic electrons.

Previous devices that have been utilized for such generation of X-rays comprise a high peak power laser that produces X-rays when a beam from the laser interacts with an electron beam in a vacuum environment. See P. Sprangle, A. Ting, E. Esarey, and A. Fisher, "Tunable, short pulse hard xrays from a compact laser synchrotron source," *J. Appl. Phys.* 72, 5032 (1992); see also A. Ting, R. Fischer, A. Fisher, K. Evans, R. Burris, J. Krall, E. Esarey, and P. Sprangle, "Observation of 20 eV xray generation in a proof of principle laser synchrotron source experiment," *J. Appl. Phys.* 78, 575 (1995). In such previous systems, the electron beam is generated by either a radio frequency linear accelerator or by another laser beam that counter-propagates with the first one.

However, aligning a laser beam with a counter-propagating electron beam is very difficult. Moreover, the length of the X-rays generated by such prior art devices is limited by the distance (usually measured in micrometers) of overlap between the laser beam and the counter-propagating electron beam.

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a method for generating coherent, polarized, and tunable X-rays using a single laser pulse.

In a first embodiment of a method for generating coherent X-rays using a single laser pulse according to the present invention, an ultrashort laser pulse is fired into a jet of gas. The laser pulse is configured to create a plasma bubble in the gas that traps and accelerates the background electrons within the plasma to multiple-tens of Mega-electron-volts (MeV), forming a beam of high-energy electrons that is co-linear with and travels behind the laser beam in a configuration known as the Laser Wakefield Acceleration. See P. Sprangle, E. Esarey, A. Ting and G. Joyce, "Laser Wake Field Acceleration and Relativistic Optical Guiding," *Appl. Phys. Lett.* 53, 2146 (1988), the entirety of which is hereby incorporated by reference into the present disclosure. In addition, some of the photons from the laser beam are backscattered by the plasma, e.g., through Raman backscattering, to generate a counter-propagating photon beam that is co-linear with the original laser beam but traveling in the opposite direction. When the backscattered photons from the counter-propagating photon beam interact with high-energy electrons in the electron beam, X-rays are generated through Compton backscattering of the photons off of the electrons.

In other embodiments, the laser is fired through a pre-existing plasma, such as a capillary discharge plasma, and in such embodiments, the high-energy electron beam and counter-propagating photon beam are formed within the pre-existing plasma.

The Raman backscattering process is continuous as the laser beam travels through the plasma, and X-rays can be generated over the entire length of the plasma, typically a few millimeters to a few centimeters. If the electron beam current and length of interaction between the electron beam and the backscattered photon beam are sufficiently high, self-amplification and generation of coherent X-rays is possible.

The energy of the X-rays depends on the energy of the accelerated electrons and can be controlled by tuning the parameters of the plasma, either by tuning the properties of the initial laser pulse to produce a plasma having specific parameters or by tuning the properties of the pre-existing plasma.

DETAILED DESCRIPTION

Figure 1A:
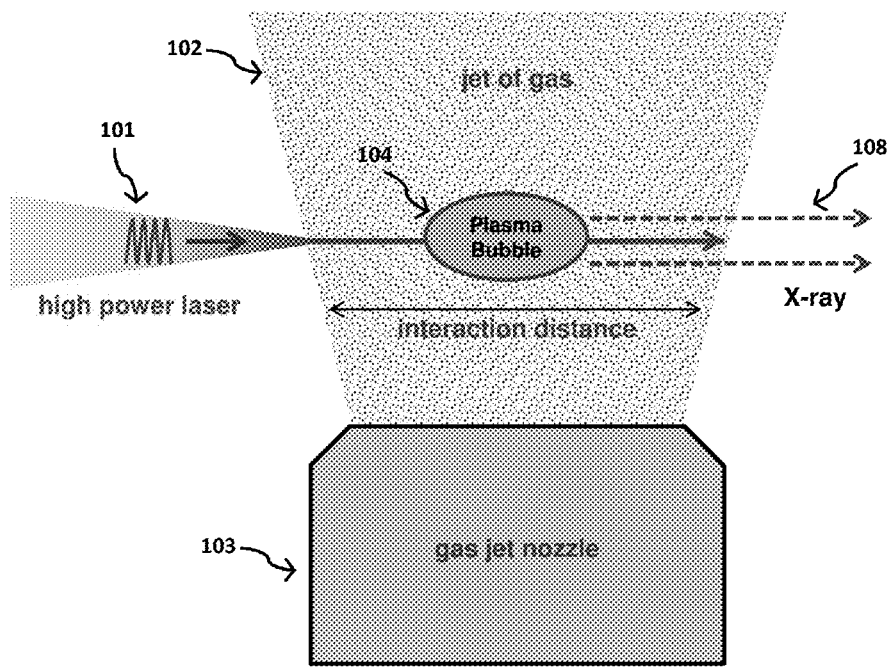
FIGS. 1A and 1B are block diagrams illustrating aspects of X-ray generation using a single laser pulse in accordance with the present invention.

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

The present invention provides a method for generating coherent, polarized, and tunable X-rays using a single laser pulse. Unlike prior art methods which separately generate the electron beam and the laser beam incident thereon, in accordance with the present invention, a single laser pulse is used to produce both the electron beam and the counter-propagating radiation which interacts with the electron beam for the Compton scattering generation of X-rays.

In the method according to the present invention, an ultrashort laser pulse is fired into a gas, where it generates a plasma, or is fired directly into a pre-existing plasma. The laser pulse is configured to excite some of the plasma electrons as the pulse travels through the plasma so as to form a beam of high-energy laser-accelerated electrons that is co-linear with and travels behind the laser pulse.

The power of the initial laser pulse determines the energy of these accelerated electrons, with the electron energy varying from tens of MeV for pulses from small (10 TW-class) lasers to GeV for petawatt (PW) systems. The electron current is calculated as the charge of the accelerated electrons (typically 0.1 to 1 nanocoulomb) divided by the electron beam duration, typically a few femto seconds, and can peak at hundreds of kA.

In addition, as the laser pulse travels through the plasma, some of the laser pulse's photons are backscattered by the plasma, e.g., through direct reflection from a plasma density gradient or through Raman backscattering, to generate a counter-propagating photon beam that is co-linear with the electron beam generated by the original laser pulse and has either the same or a slightly shifted wavelength as the initial pulse but travels in the opposite direction. Direct reflection of the laser beam from a plasma density gradient would produce a backward-travelling beam of photons having the same wavelength as the original laser beam, while stimulated Raman scattering would produce a backward travelling beam having a wavelength shifted in proportion to the resonant frequency of the plasma in a manner well known in the art. When the backscattered photons interact with the high-energy electrons, an emission of X-rays is generated through Compton backscattering of the photons off of the electrons.

Compton backscattering is an inelastic process in which the scattered photons are Doppler-upshifted to X-ray frequencies such that the X-ray wavelength $$\lambda = \frac{\lambda_0}{4\gamma^2},$$

where $\lambda_0$ is the wavelength of the counter-propagating optical radiation, and $\gamma$ is the relativistic factor of the accelerated electrons that interact with the counter-propagating radiation. The relativistic factor $\gamma$ varies with the electron energy, which, as described above varies with the power of the initial laser pulse, and thus, the wavelength of the X-rays generated in accordance with the method of the present invention can be tuned by varying the power of the initial laser pulse, its wavelength, or both. Because the laser often used in the method of the present invention is a high-power laser operating at a single wavelength, tuning the power of the laser pulse is often the most practical way of tuning the X-ray wavelength. For example, tuning the power of the laser pulse to produce a beam of accelerated electrons having an energy of 40 MeV will give a relativistic value $\gamma$ of 80, so that for a laser wavelength of 1 µm, the X-ray emission produced would be at a wavelength of 0.0125 µm.

In addition, as described below, the characteristics of the backscattered Raman radiation, and thus of the resulting laser-generated X-rays, can be controllably tuned by shaping the initial laser pulse.

Figure 1B:
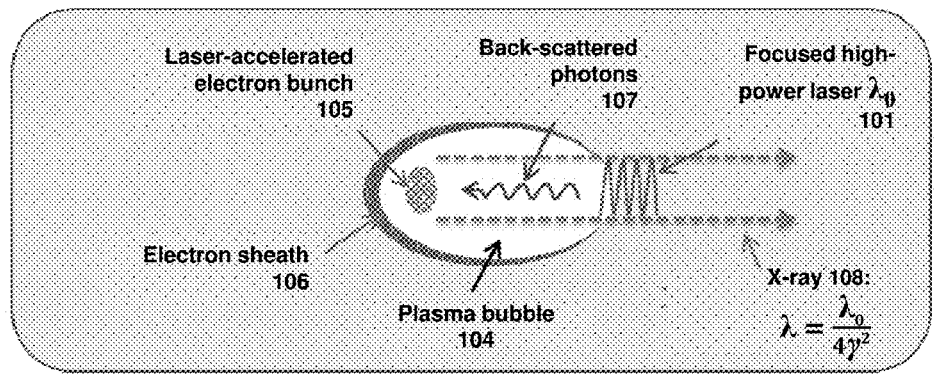

FIGS. 1A and 1B are block diagrams illustrating aspects of a an exemplary embodiment of a method for generating coherent X-rays in accordance with the present invention.

In the method of the present invention, a high-power laser pulse is fired into a plasma, where the pulse forms a tightly focused beam which produces the high-energy electrons and backscattered radiation needed to generate X-rays. In order to produce such a beam, the pulse should have a power P greater than a critical power $P_c$ required for relativistic self-focusing in the plasma, $P_c$ (in gigawatts [GW]) being given by the formula $$P_c = 17.4\left(\frac{\lambda_p}{\lambda}\right)^2$$

where $\lambda_p$ is the wavelength of the plasma resonant frequency and $\lambda$ is the laser wavelength. The laser pulse will then be further focused through relativistic effects so as to remain at high laser intensities to produce both an extended propagation distance in the plasma and an enhanced electron beam final energy.

In some embodiments the laser pulse itself creates the plasma. For example, in the embodiment illustrated in FIG. 1A, the laser is fired into a jet of gas 102 from a gas jet nozzle 103. Suitable gases that can be used in the method of the present invention include Hydrogen, Helium, and other gases either in combination or standing alone. The laser pulse is configured to have sufficient intensity, through relativistic self-focusing and/or through geometric focusing, e.g., with an off-axis parabolic mirror, to ionize the gas and create a plasma bubble 104. In other embodiments, the laser is fired through a pre-existing plasma such as a capillary discharge plasma or a laser-induced hydrodynamic plasma density channel known in the art, see D. Kaganovich, P. Sasorov, C. Cohen, and A. Zigler, "Investigations of double capillary discharge scheme for production of wave guide in plasma," *Appl. Phys. Lett.* 71, 2925 (1997); and C. G. Durfee III and H. M. Milchberg, "Light pipe for high intensity laser pulses," *Phys. Rev. Lett.* 71, 2409 (1993), and in such embodiments, the high-energy electron beam and counter-propagating photon beam are formed within the pre-existing plasma.

In either case, the laser pulse will have a power P above the critical power $P_c$ of the plasma. As noted above, the power of the laser pulse is its energy divided by its duration, such that, for example, aa 5 Joule pulse having a duration of 50 femtoseconds will have a power of 100 TeraWatt (TW). A pulse having this much power will be relativistically self-guided into a high intensity filament that can accelerate the background plasma electrons to high energy so that they form laser-accelerated electron bunches 105 illustrated in FIG. 1B. This regime of electron acceleration is known as plasma-bubble acceleration, as electrons are trapped and accelerated in the plasma cavity (i.e., plasma bubble 104) formed by the laser. Thus, in accordance with the present invention, laser pulse 101 is configured to have sufficient energy to accelerate the background electrons in plasma bubble 104 to multiple-tens of Mega-electron-volts (MeV), forming a beam of high-energy, accelerated electron bunches 105 within an electron sheath 106, the electron beam being co-linear with and travelling behing the laser pulse 101.

At the same time, as laser pulse 101 travels through the plasma, photons from the laser pulse are scattered by ripples (waves) of plasma electrons caused by the resonant oscillations in the plasma density (i.e., the density of free electrons in the plasma) that occur when the plasma is disturbed by the intense laser pulse. The photons from the laser pulse are inelastically scattered off this plasma wave through a backscattering mechanism such as stimulated Raman backscattering, with the scattered photons having a shift in wavelength proportional to the resonant frequency of the plasma. The energy in this Raman backscattered (RBS) radiation can be a significant fraction (10% or more) of the original laser pulse. See N. E. Andreev, "Excitation Of Langmuir Oscillations in a Plasma by the Field of a Transverse Wave," *SOVIET PHYSICS JETP*, Vol. 32, No. 6 (1971). If the plasma is cold, i.e., the thermal motion of the free plasma electrons is not relativistic, the growth rate of this stimulated RBS radiation is maximized in the backward direction such that the scattering produces a counter-propagating beam 107 of backscattered photons which also is co-linear with the original beam and is, therefore, also co-linear with the beam of accelerated electron bunches produced by the laser energy, but travels in the opposite direction.

As the backscattered photons from the RBS radiation collide with the accelerated electron bunches 105, bright Compton-scattered X-rays 108 are generated in the same direction as the original laser pulse.

Thus, in accordance with the present invention, firing a single high-powered laser pulse into a plasma can produce an emission of X-rays, with the energy of the X-rays being tunable by tuning the power of the initial laser pulse.

In addition, because the initial laser pulse 101 is polarized, the resulting X-rays are also polarized, and thus, by adjusting the polarization of the laser pulse, the polarization of the X-rays produced from the laser pulse in accordance with the present invention also can be easily tuned.

However, although the drive laser and the Raman backscattered radiation are both coherent, the X-rays generated by the ordinary Compton scattering process are not always coherent. Coherent emission requires periodic bunching of the electrons in the high energy electron beams at the X-ray wavelength, such that all of the bunched electrons emit the X-ray radiation at the same phase.

The backscattering of the laser radiation is a continuous process, and the accelerated electrons can interact with the backscattered radiation over an interaction distance that traverses the entire length of the plasma, typically a few millimeters to a few centimeters long. If the intensity of the backscattered radiation is sufficiently high (e.g., at least 2% of the pump laser intensity) and the interaction distance is long, periodic bunching of the electrons begins to occur, and self-amplification of the X-rays, achieving exponential gain, is possible. For example, for 40 MeV electrons having peak current of 100 kA interacting with backscattered photons having a power of 0.2 TW, the X-ray emission will self-amplify by a factor of e every 100 μm of interaction distance (known as the "e-folding distance"), where e is the natural logarithm base having a value of about 2.718. By increasing the interaction distance, e.g., by increasing the width of the plasma to several e-folding distances, the intensity of the output X-ray can be increased by several orders of magnitude. In addition, as described above, this exponential gain in the X-ray radiation amplitude is a consequence of the periodic bunching of the electrons at the X-ray wavelength, and so the X-rays emitted under such conditions would also be coherent.

Because the intensity of the X-rays produced in accordance with the present invention increases by a factor of e for each e-folding length of interaction distance within the plasma, an X-ray emission having a desired intensity can be produced by tailoring the width of the plasma. In embodiments where the laser is fired into a pre-existing plasma, tailoring the width of the interaction distance is easily achieved by adjusting the width of the plasma. In embodiments where the plasma is generated by the laser traveling through a gas jet, the width of the plasma can be tuned by changing the length of the gas jet nozzle or by adjusting its height with respect to the height of the laser pulse through the gas (e.g., by adjusting the height of the laser source with respect to the nozzle).

In addition, as noted above, the energy and wavelength of X-rays generated by a single laser pulse in accordance with the method of the present invention can be tuned by altering one or more characteristics of the plasma, the laser pulse, or both. For example, since the power of the initial laser pulse determines the energy of the accelerated electron bunches in the plasma, which in turn determines the energy of the resulting X-rays, X-rays having a desired energy can be produced by tuning the power of the initial laser pulse, i.e., by tuning its energy, its duration, or both. Similarly, because the wavelength of the resulting X-rays is dependent on the energy of the accelerated electron bunches, the power of the initial laser pulse can be tuned to produce an emission of X-rays having a desired wavelength.

The density of the plasma can also be configured to enhance the energy of the laser-accelerated electron bunches. For example, example fast-rise slow-fall profiles inside a gas jet can be suitable for efficient down-ramp type of electron trapping and injection. See C. G. R. Geddes, K. Nakamura, G. R. Plateau, C. Toth, E. Cormier-Michel, E. Esarey, C. B. Schroeder, J. R. Cary, and W P. Leemans, "Plasma-Density-Gradient Injection of Low Absolute-Momentum-Spread Electron Bunches," *Phys. Rev. Lett.* 100, 215004 (2008). Such plasma-density profiles can be created by means described in D. Kaganovich, D. F. Gordon, M. H. Helle, and A. Ting, "Shaping gas jet plasma density profile by laser generated shock waves," *Journal of Applied Physics* 116, 013304 (2014). Thus, in accordance with the present invention, the density of the plasma can be configured so as to produce background electrons in the plasma and/or backscattered radiation having a desired energy, which in turn produce X-rays having a desired energy. In some embodiments, the density of the plasma can be made to be non-uniform, i.e., to have a density gradient, so as to create direct reflected radiation or to optimize the back Raman scattering.

In cases where the plasma is generated by the laser pulse traveling through a gas jet, the density of the gas—and therefore the density of the plasma—varies with height above the gas jet nozzle, and therefore the density of the plasma can be tuned by adjusting the height of the laser pulse above the nozzle. As noted above, such a change in relative height of the laser pulse will also alter the interaction distance between the laser-accelerated electron bunches and the backscattered photon beam, and so both effects need to be taken into account in practicing the method of the present invention.

In other cases, the laser pulse can be shaped to produce X-rays having desired characteristics. Details regarding shaping of a laser pulse can be found in U.S. Patent Application Publication No. 2015/0146748 entitled "Pulse-Shaping Interferometer for Chirped-Pulsed Amplication Laser" ('748 application) which shares at least one inventor in common with the present invention and which is hereby incorporated by reference into the present disclosure in its entirety.

Figure 2:
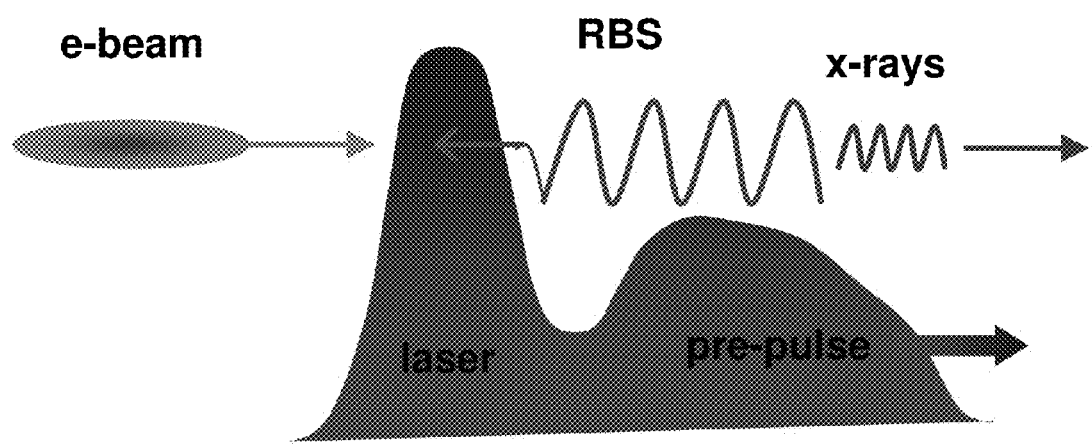
FIG. 2 is a block diagram illustrating an exemplary way in which the laser pulse can be shaped to tune the characteristics of X-rays produced from a laser pulse in accordance with the present invention.

FIG. 2 is a block diagram illustrating how the laser pulse can be shaped to produce X-rays having one or more of a desired energy, intensity, polarization and/or coherence.

The temporal profile of the laser pulse is modified to enhance the stimulated Raman backscattering. For example, as illustrated in FIG. 2, a long pre-pulse can be created in front of the main pulse, e.g., by the intentional clipping of the laser spectrum as described in the '748 application, supra. This long pre-pulse in front of the main pulse will enhance stronger Raman instability and generate more backscattered radiation necessary for the Compton scattering and X-ray production.

Advantages and New Features

To overcome the necessity of using an external counter-propagating laser beam for the Compton scattering generation of X-rays, self-generated photons from backscattered radiation of the laser in plasma are utilized. These backscattered photons are inherently self-aligned to the electron beam. This proposed configuration is simple and experimentally robust since it requires only one ultrashort laser pulse. In addition the backscattering of the laser is a continuous process and X-rays are generated over the entire length of the plasma that is typically a few millimeters to a few centimeters long.

Such coherent, polarized X-rays can be produced in accordance with the present invention using a compact, table-top laser device.

Both the high-energy electrons and the counter-propagating photon beam are self-generated by the laser pulse as it travels through in the plasma. In addition, both the electron beam and the counter-propagating photon beam are co-linear with the original laser beam, so that the X-rays can be produced without the need to align an electron and counter-propagating beams.

Alternatives

Although particular embodiments, aspects, and features have been described and illustrated, it should be noted that the invention described herein is not limited to only those embodiments, aspects, and features, and it should be readily appreciated that modifications may be made by persons skilled in the art.

For example, the Laser Synchrotron Source (LSS) is a compact source of short-pulse, near monochromatic, tunable X-rays. It utilizes conventional (radio frequency linear or betatron) accelerators and a separate laser. It generates X-rays in colliding beam geometry and interaction length is limited to overlap between the laser and accelerated electron beam. Because the peak current of conventional accelerator is much lower, the interaction length for self-amplified spontaneous emission is much longer than in proposed single-beam all-optical device. However, other suitable electron and laser sources such as the Laser Wakefield Accelerator and the back Raman radiation can be used in the method of the present invention.

In some embodiments, the plasma can be produced by the laser beam, e.g., by the laser beam travelling through a jet of gas as described above. In other embodiments, a preformed plasma guiding structure can be used for standard wakefield acceleration regime with external injection of accelerated electrons.

The present application contemplates these and any and all other modifications that can be made within the spirit and scope of the underlying invention described and claimed herein, and all such embodiments are within the scope and spirit of the present disclosure.

What is claimed is:

1. A method for generating an emission of coherent X-rays, comprising:
    firing a laser pulse into a gas jet, a power of the laser pulse being configured to produce a laser-generated plasma within the gas jet, the power of the laser pulse and a width of the gas jet being configured to produce a plurality of high-energy laser-accelerated electron bunches within the plasma, the electron bunches being co-linear with and following behind the laser pulse as it travels through the gas jet;
    wherein a density profile of the plasma and a temporal profile of the laser pulse are configured to cause a plurality of photons from the laser pulse to be continuously backscattered by the plasma by means of stimulated Raman backscattering over an entire length of the plasma to produce a Raman-backscattered counter-propagating photon beam having a desired energy and being co-linear with the electron bunches in the plasma;
    wherein the Raman-backscattered counter-propagating photon beam interacts with the electron bunches in the plasma, a length of the plasma and an energy of the Raman-backscattered counter-propagating photon beam being configured to cause the electron bunches to form a beam of periodic electron bunches at a predetermined X-ray wavelength; and
    further wherein photons from the Raman-backscattered counter-propagating photon beam continuously scatter off electrons from the periodic electron bunches over an interaction distance that traverses the entire length of the plasma to generate a self-amplified emission of coherent X-rays having a predetermined energy and having the predetermined X-ray wavelength.

2. The method according to claim 1, wherein an energy of the laser pulse is tuned to produce an emission of X-rays having a desired energy.

3. The method according to claim 1, wherein a duration of the laser pulse is tuned to produce an emission of X-rays having a desired energy.

4. The method according to claim 1, wherein a polarization of the laser pulse is tuned to produce an emission of X-rays having a desired polarization.

5. The method according to claim 1, wherein a wavelength of the laser pulse is tuned to produce an emission of X-rays having a desired wavelength.

6. The method according to claim 1, wherein a length of a nozzle producing the gas jet is tuned to produce a desired length of the interaction distance so as to produce an emission of X-rays having a desired degree of coherence.

7. The method according to claim 1, wherein a height of a source of the laser pulse with respect to a nozzle producing the gas jet is tuned to produce a desired length of the interaction distance so as to produce an emission of X-rays having a desired degree of coherence.

8. The method according to claim 1, wherein a height of a source of the laser pulse with respect to a nozzle producing the gas jet is tuned to produce a desired density in the plasma so as to produce an emission of X-rays having a desired energy.

9. The method according to claim 1, wherein a shape of the laser pulse is configured to produce an emission of X-rays having a desired energy.

10. A method for generating an emission of coherent X-rays, comprising:
    firing a laser pulse into a plasma, the power of the laser pulse and a width of the laser pulse being configured to produce a plurality of high-energy laser-accelerated electron bunches within the plasma, the electron bunches being co-linear with and following behind the laser pulse as it travels through the plasma;
    wherein a density profile of the plasma and a temporal profile of the laser pulse are configured to cause a plurality of photons from the laser pulse to be continuously backscattered by the plasma by means of stimulated Raman backscattering over an entire length of the plasma to produce a Raman-backscattered counter-propagating photon beam having a desired energy and being co-linear with the electron bunches in the plasma;
    wherein the Raman-backscattered counter-propagating photon beam interacts with the electron bunches in the plasma, a length of the plasma and an energy of the Raman-backscattered counter-propagating photon beam being configured to cause the electron bunches to form a beam of periodic electron bunches at a predetermined X-ray wavelength; and
    further wherein photons from the Raman-backscattered counter-propagating photon beam continuously scatter off electrons from the periodic electron bunches over an interaction distance that traverses the entire length of the plasma to generate a self-amplified emission of coherent X-rays having a predetermined energy and having the predetermined X-ray wavelength.

11. The method according to claim 10, wherein an energy of the laser pulse is tuned to produce an emission of X-rays having a desired energy.

12. The method according to claim 10, wherein a duration of the laser pulse is tuned to produce an emission of X-rays having a desired energy.

13. The method according to claim 10, wherein a polarization of the laser pulse is tuned to produce an emission of X-rays having a desired polarization.

14. The method according to claim 10 wherein a wavelength of the laser pulse is tuned to produce an emission of X-rays having a desired wavelength.

15. The method according to claim 10, wherein a length of the plasma is tuned to produce a desired length of the interaction distance so as to produce an emission of X-rays having a desired degree of coherence.

16. The method according to claim 10, wherein a density of the plasma is tuned so as to produce an emission of X-rays having a desired energy.

17. The method according to claim 10, wherein a shape of the laser pulse is configured to produce an emission of X-rays having a desired energy.

\* \* \* \* \*